(12) United States Patent
Schmid

(10) Patent No.: US 11,332,059 B2
(45) Date of Patent: May 17, 2022

(54) STORAGE DEVICE FOR A MOTOR VEHICLE

(71) Applicant: Bayerische Motoren Werke Aktiengesellschaft, Munich (DE)

(72) Inventor: Bernhard Schmid, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 55 days.

(21) Appl. No.: 16/553,763

(22) Filed: Aug. 28, 2019

(65) Prior Publication Data

US 2019/0381922 A1 Dec. 19, 2019

Related U.S. Application Data

(63) Continuation of application No. PCT/EP2018/054880, filed on Feb. 28, 2018.

(30) Foreign Application Priority Data

Mar. 2, 2017 (DE) ..................... 10 2017 203 439.4

(51) Int. Cl.
*B60N 3/00* (2006.01)
(52) U.S. Cl.
CPC .................... *B60N 3/001* (2013.01)
(58) Field of Classification Search
CPC ......... B60R 3/001; B60R 3/002; B60R 3/004; B60R 2011/005; B62D 25/14; B60N 3/002; B60N 3/004
USPC ...................................................... 296/37.12
See application file for complete search history.

(56) References Cited

U.S. PATENT DOCUMENTS

| 2,588,706 | A |   | 3/1952 | Davis |
| 3,650,223 | A | * | 3/1972 | Kobori ..................... A47C 7/70 108/44 |
| 5,005,702 | A | * | 4/1991 | Davis ................... A47B 23/002 108/43 |
| 5,134,930 | A | * | 8/1992 | Mei-Hwa ............... A47B 23/00 100/42 |

(Continued)

FOREIGN PATENT DOCUMENTS

| CN | 104228644 A | 12/2014 |
| DE | 2 044 230 A | 6/1971 |

(Continued)

OTHER PUBLICATIONS

International Search Report (PCT/ISA/210) issued in PCT Application No. PCT/EP2018/054880 dated May 29, 2018 with English translation (four (4) pages).

(Continued)

*Primary Examiner* — D Glenn Dayoan
*Assistant Examiner* — Kevin P Weldon
(74) *Attorney, Agent, or Firm* — Crowell & Moring LLP

(57) ABSTRACT

A motor vehicle with a vehicle interior includes a dashboard arranged in front of at least one front seat. A storage device is movable in a reversible manner, by way of a movement mechanism, from a not-in-use position in the dashboard into a use position in front of the front seat. The storage device is arrested at least in the use position. In the use position, the storage device has a carrying structure made up of two laterally arranged, inflated supporting elements. An approximately horizontally oriented table top is arranged on the two supporting elements.

12 Claims, 2 Drawing Sheets

(56) References Cited

U.S. PATENT DOCUMENTS

| | | | | |
|---|---|---|---|---|
| 7,836,832 B2* | 11/2010 | Boyd | ................... | A47B 3/04 |
| | | | | 108/40 |
| 10,232,815 B1* | 3/2019 | Dry | ................... | B60R 21/207 |
| 2003/0232591 A1* | 12/2003 | Nanaumi | ........... | B60H 1/00507 |
| | | | | 454/156 |
| 2008/0190329 A1 | 8/2008 | Boyd et al. | | |
| 2010/0072773 A1* | 3/2010 | Leal | ................... | B60J 1/2091 |
| | | | | 296/97.7 |
| 2016/0157601 A1* | 6/2016 | Koulizakis | ......... | A47B 21/0314 |
| | | | | 108/50.14 |
| 2017/0291710 A1 | 10/2017 | Barr-Perea et al. | | |
| 2020/0237092 A1* | 7/2020 | Paindavoine | ............ | A47B 3/04 |

FOREIGN PATENT DOCUMENTS

| | | | | |
|---|---|---|---|---|
| DE | 198 04 461 C1 | | 7/1999 | |
| DE | 10 2007 036 439 A1 | | 2/2009 | |
| DE | 10 2008 032 326 A1 | | 4/2009 | |
| DE | 10 2007 052 975 A1 | | 5/2009 | |
| EP | 530819 | * | 10/1993 | ............. B60R 21/02 |
| FR | 2774339 | * | 8/1999 | ............... B60R 7/04 |
| FR | 2940941 | * | 7/2010 | ............... B60R 7/04 |
| GB | 1 314 608 A | | 4/1973 | |

OTHER PUBLICATIONS

German-language Written Opinion (PCT/ISA/237) issued in PCT Application No. PCT/EP2018/054880 dated May 29, 2018 (four (4) pages).

German-language Search Report issued in counterpart German Application No. 10 2017 203 439.4 dated Jan. 31, 2018 with partial English translation (13 pages).

English-language Chinese Office Action issued in Chinese application No. 201880012510.7 dated Apr. 14, 2021 (Five (5) pages).

* cited by examiner

STORAGE DEVICE FOR A MOTOR VEHICLE

CROSS REFERENCE TO RELATED APPLICATIONS

This application is a continuation of PCT International Application No. PCT/EP2018/054880, filed Feb. 28, 2018, which claims priority under 35 U.S.C. § 119 from German Patent Application No. 10 2017 203 439.4, filed Mar. 2, 2017, the entire disclosures of which are herein expressly incorporated by reference.

BACKGROUND AND SUMMARY OF THE INVENTION

The invention relates to a motor vehicle.

DE 102007052975 A1 discloses a motor vehicle which has no dashboard, or has a dashboard of significantly reduced depth, on the front-passenger side, in front of a front-passenger seat. It is possible to arrange a table in a use position in the free space formed in front of the front-passenger seat. The table can be moved, by way of a movement mechanism, out of a not-in-use position into a use position, and back, and can be arrested in these positions.

It is the object of the invention to create a motor vehicle with a storage device, wherein the storage device can be moved out of a not-in-use position into a use position and back, and can be arrested in these positions.

In a vehicle interior of a motor vehicle according to the invention, a dashboard or the like is arranged in front of at least one front seat. A storage device, which may be a table, can be moved in a reversible manner, by way of a movement mechanism, out of a not-in-use position in the dashboard into a use position in front of the front seat. The storage device can be arrested at least in the use position.

In the use position, the storage device is advantageously provided with a carrying structure made up of two laterally arranged, inflated supporting elements. An approximately horizontally oriented table top is arranged on the two supporting elements.

In an advantageous embodiment, the respective supporting element has an upper, horizontally running hollow-chamber longitudinal crosspiece. A second hollow-chamber longitudinal crosspiece is spaced apart in the vertical direction from the upper, horizontally running hollow-chamber longitudinal crosspiece. The two hollow-chamber longitudinal crosspieces are connected to one another by vertically running connecting crosspieces and/or by obliquely running connecting crosspieces.

A two-way compressor is advantageously provided and is connected to the respective inflatable supporting element via hoses or the like. The two-way compressor generates compressed air for inflating the supporting elements and generates a vacuum in order to evacuate air from the inflated supporting elements, so that the emptied supporting elements can be moved into a not-in-use position.

An advantageous embodiment provides at least one emergency valve which, in dependence on at least one crash sensor, is opened automatically in the event of a crash, and therefore, as a result of the emptying supporting elements, the storage device becomes at least pliant or is moved into the not-in-use position.

A table top is advantageously constructed from individual lamellae.

In an advantageous embodiment, the lamellae can be rotated about a horizontal axis of rotation. The horizontal axis of rotation runs perpendicularly to the movement direction of the table top when the table top is moved from the not-in-use position into the use position and back.

In an advantageous embodiment, a respective end of the respective lamella is fastened on the respective upwardly oriented outer surface of the respective supporting element.

A respective rolling-action spring is advantageously fastened on either side of a respective upwardly directed outer surface of the respective lamella.

In an advantageous embodiment, the respective rolling-action spring is subjected to maximum prestressing in the use position so that, when air is evacuated from the respective supporting element, it rolls up in the direction of the not-in-use position.

The rolling-action springs advantageously have their fastened end arranged in a cavity formed in the placement location for the not-in-use position of the table.

In an advantageous embodiment, a respective fixing plate, which extends in the vertical direction, is arranged at a rear end of the table, on a rear lamella, as seen in the direction of the not-in-use position. The respective fixing plate has at least two guide pins, which can be displaced in two guide rails. The two guide rails are formed in a cavity at the placement location in the not-in-use position.

Latching positions for securing the table in the use position are advantageously formed in the two guide rails. It is also the case that latching positions for securing the table in the not-in-use position are formed in the two guide rails if required.

In an advantageous embodiment, an (end) lamella formed at a free end of the table is provided with a handle strip or a handle.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a perspective view of a first embodiment of a storage device in a use position, wherein a table is rolled together via rolling-action springs or the like.

DETAILED DESCRIPTION OF THE DRAWINGS

A first embodiment of a storage device in the form of a table 1 can be stowed in a deactivated state, or in a not-in-use position, in a cavity of a dashboard (not illustrated) in a motor vehicle.

Figure 1:
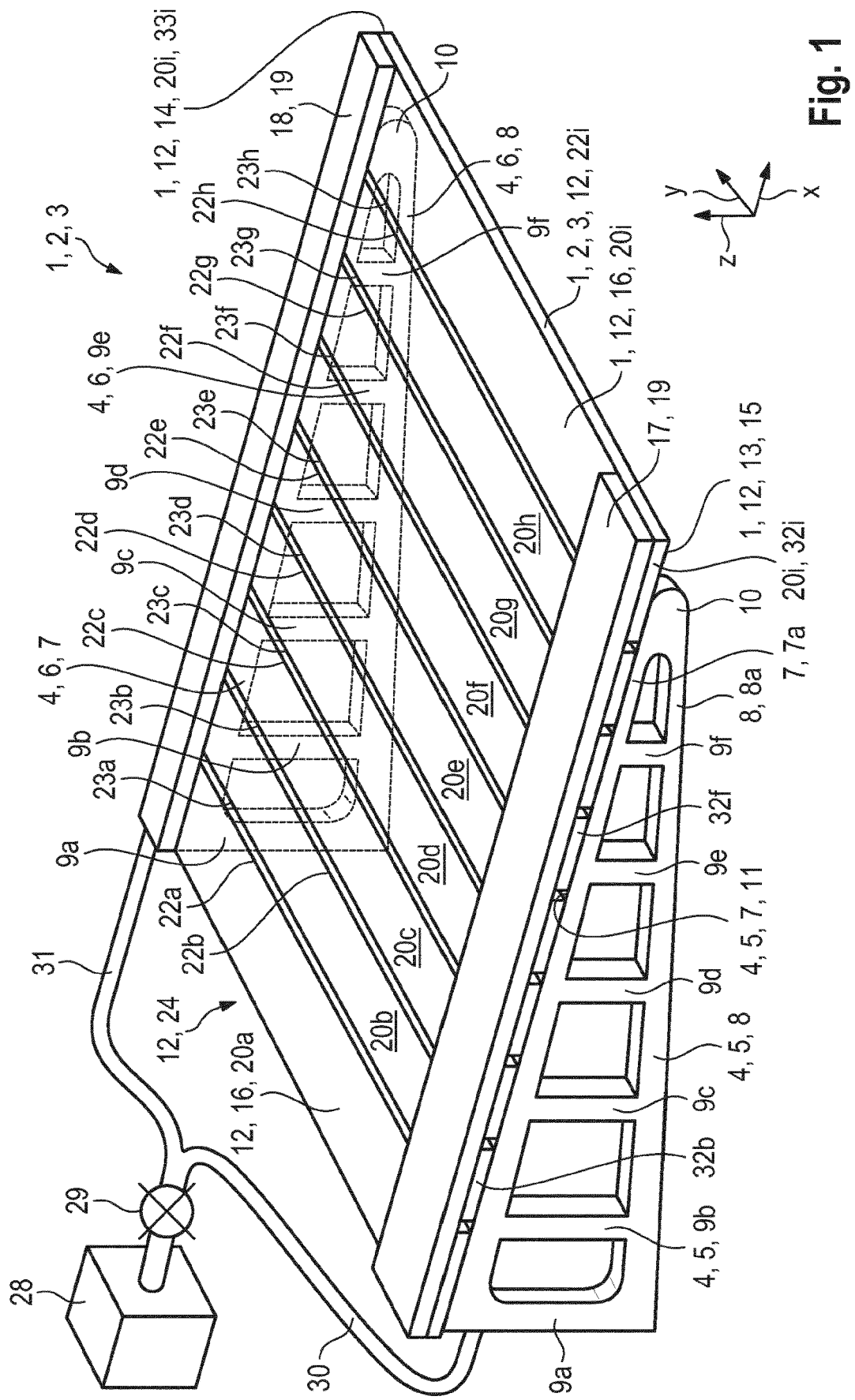

In an activated state or an operating position or a use position 2, which is shown in FIG. 1, the table 1 is located above the thigh of a vehicle occupant sitting on a seat.

A front, free end 3 of the table 1 is directed toward the vehicle occupant sitting on the seat. The front, free table end 3 is located at an ergonomically favorable distance in front of the upper body of the vehicle occupant sitting on the seat, as is known from the table arrangement of DE 102007052975 A1.

In the embodiment shown, the table 1 moves out of the not-in-use position (not illustrated) in the cavity of the dashboard, in the longitudinal direction x of the vehicle, into the use position 2, which is shown in FIG. 1, and can be moved back out of the use position 2 into the not-in-use position.

In the first embodiment, which is shown in FIG. 1, the table 1 is moved by being rolled together via rolling-action springs 17, 18 or the like.

A carrying structure 4 of the table 1 is formed by two inflatable supporting elements 5, 6, which are triangular in side view. In the embodiment shown, the supporting elements 5, 6 are each formed from two longitudinally running hollow-chamber crosspieces 7, 8, which are connected to one another by vertical crosspieces 9a to 9f.

In the embodiment shown, the upper hollow-chamber longitudinal crosspiece 7 runs horizontally in the longitudinal direction x of the vehicle. The lower hollow-chamber longitudinal crosspiece 8, which is spaced apart from the upper hollow-chamber longitudinal crosspiece 7, runs obliquely in the longitudinal direction x of the vehicle, beneath the upper hollow-chamber longitudinal crosspiece 7.

As a result of the lower hollow-chamber longitudinal crosspiece 8 running obliquely, the two free ends 7a, 8a of the two hollow-chamber longitudinal crosspieces 7, 8 are connected to one another to form a joint end 10.

In another embodiment, the lower hollow-chamber longitudinal crosspiece 8, which is spaced apart from the upper hollow-chamber longitudinal crosspiece 7, can likewise run horizontally.

A storage panel or table top 12 has its side peripheries 13, 14 fastened, via the downwardly oriented outer surface 15 thereof, on an upwardly oriented outer surface 11 of the respective upper, horizontally running hollow-chamber longitudinal crosspiece 7.

In the embodiment shown, the table top 12 is constructed from individual lamellae 20a to 20i. In one embodiment, the lamellae 20a to 20i are spaced apart from one another via a gap along the opposite front longitudinal end surfaces 22a to 22i and rear longitudinal end surfaces 23a to 23i of oppositely located lamellae 20, or they butt against one another, such that a rolling movement is still possible.

In another embodiment, form-fitting connections, such as groove-and-tongue connections or the like, can be formed on the longitudinal end surfaces 20 and 23 of the lamellae 20.

A respective end 32, 33 of the respective lamella 20a to 20i forming the table top 12 is fastened on the respective upwardly oriented outer surface 11 of the respective supporting element 5, 6.

A respective rolling-action spring 17, 18 is fastened on an upwardly oriented outer surface 16 of the respective side periphery 13, 14 of the table top 12.

In FIG. 1, in the use position 2 of the table 1, the respective rolling-action spring 17, 18 is located in the rolled-out state 19. In the rolled-out state 19 of the respective rolling-action spring 17, 18, in the use position 2 of the table 1, the respective rolling-action spring 17, 18 is located in a prestressed state or the respective rolling-action spring 17, 18 is subjected to maximum prestressing.

Starting from a predetermined level of instability of the inflated supporting elements 5, 6 as air is being evacuated, the rolling-action springs 17, 18 subjected to maximum prestressing roll up the lamellae 20a to 20i arranged thereon and the evacuated supporting elements 5, 6. In the rolled-up state of the rolling-action springs 17, 18, the rolling-action springs 17, 18 have a minimal level of spring force. The carrying structure 4 loses its rigidity as a result of air being evacuated from the inflated supporting elements 5, 6.

In the embodiment shown, the inflatable supporting elements 5, 6 are connected to a two-way compressor 28 and, for example, to an emergency valve 29 via hoses 30 and 31. The two-way compressor 28 can generate compressed air and a vacuum. The inflatable supporting elements 5, 6 are inflated, and moved into the use position 2, by virtue of the compressed air generated by the two-way compressor 28. In order to evacuate air from the inflated supporting elements 5, 6, the two-way compressor 28 generates a vacuum, and therefore the air located in the inflated supporting elements 5, 6 is pumped out.

The emergency valve 29 is connected to at least one crash sensor. In dependence on the crash sensor (not illustrated), the emergency valve is opened automatically in the event of a crash, and therefore the air in the supporting elements 5, 6 can escape and the table is pushed away by the vehicle occupant sitting on the corresponding seat.

Figure 2:
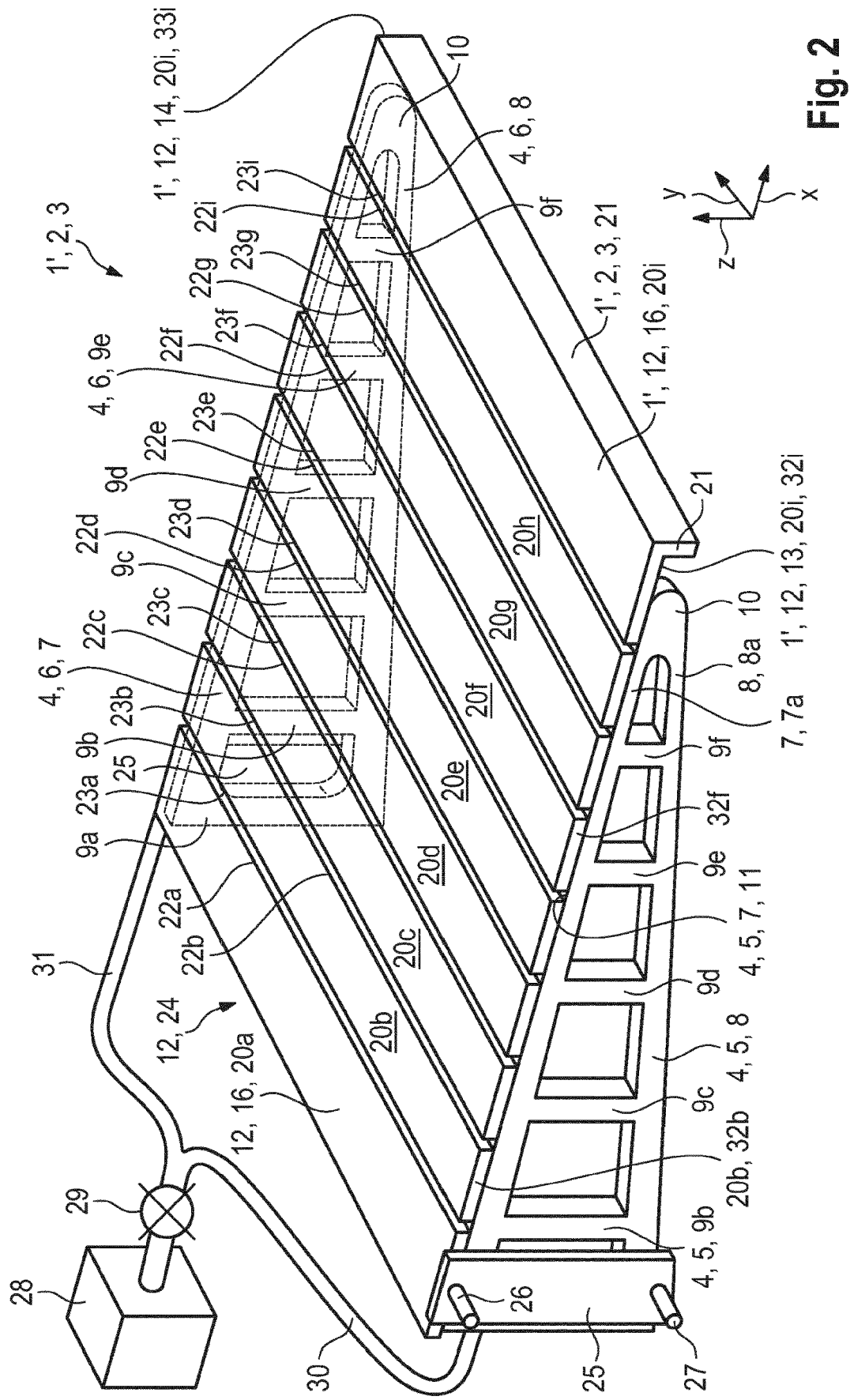
FIG. 2 is a perspective view of a second embodiment of a storage device in a use position, wherein a table has projecting guide pins on either side at its rear end.

With the exception of the way in which it moves out of the not-in-use position into the use position 2 and back, the table 1' of FIG. 2 otherwise corresponds with the table 1 of FIG. 1.

In the second embodiment of a storage device in the form of a table 1', which is shown in FIG. 2, the table 1' is displaced out of the use position 2 into a not-in-use position and back via guide pins 26, 27. The guide pins 26, 27 are arranged on the side of the table 1' and are each guided in guide rails (not illustrated) in the cavity of the placement location for the not-in-use position.

In one embodiment, a respective vertically running fixing plate 25, which in the embodiment shown has 2 spaced-apart guide pins 26, 27, is fastened at a rear end 24 of the table 1', on the two side peripheries 13, 14 of the table top 12. The respective guide pins 26, 27, which are formed on either side, project in the transverse direction y of the table 1' or in the transverse direction y of the vehicle.

The fixing plate 25 is located in a concealed manner in the cavity in which the table 1' is arranged in the not-in-use position, for example in the dashboard. The guide pins 26, 27 of the respective fixing plate 25 are arranged in guides (not shown) formed in the cavity of the placement location of the table in the not-in-use position.

In the use position 2 shown in FIG. 2, the respective guide pins 26, 27 of the respective fixing plate 25 are latched-in in locking positions of the guides (not illustrated). The guide pins 26, 27 of the respective fixing plate 25 can be moved out of the latching position as a result of the table being subjected to raising and/or pulling action.

In the embodiment shown, the lamella 20i is provided with a handle strip 21 at the front, free end 3 of the table 1'. The handle strip 21 is used to raise and/or pull on the table 3, in order for the table 3 to be moved out of the respective latching position in the guides and into the use position 2 or into the not-in-use position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a vehicle interior, comprising:
    a dashboard arranged in front of at least one front seat;
    a storage device movable in a reversible manner, by way of a movement mechanism, from a not-in-use position in the dashboard into a use position in front of the front seat, wherein the storage device is arrested at least in the use position,
in the use position, the storage device has a carrying structure made up of a first and a second laterally arranged, inflated supporting element,
an approximately horizontally oriented table top is arranged on the first and the second supporting elements,
the table top is constructed from individual lamellae, and
a first distal end of the table top is fastened on a first upwardly oriented outer surface of the first supporting element and a second distal end of the table top is fastened on a second upwardly oriented outer surface of the second supporting element.

2. A motor vehicle having a vehicle interior, comprising:
a dashboard arranged in front of at least one front seat;
a storage device movable in a reversible manner, by way of a movement mechanism, from a not-in-use position in the dashboard into a use position in front of the front seat, wherein
the storage device is arrested at least in the use position,
in the use position, the storage device has a carrying structure made up of two laterally arranged, inflated supporting elements,
an approximately horizontally oriented table top is arranged on the two supporting elements,
each respective supporting element has:
an upper, horizontally running hollow-chamber longitudinal crosspiece,
a second hollow-chamber longitudinal crosspiece spaced apart in a vertical direction from the upper, horizontally running hollow-chamber longitudinal crosspiece, and
the two hollow-chamber longitudinal crosspieces are connected to one another by vertically running connecting crosspieces and/or by obliquely running connecting crosspieces.

3. The motor vehicle according to claim 2, further comprising:
a two-way compressor connected to the respective inflatable supporting elements via hoses, wherein
the two-way compressor generates compressed air for inflating the supporting elements, and
the two-way compressor generates a vacuum in order to evacuate air from the inflated supporting elements, so that the emptied supporting elements are movable into a not-in-use position.

4. The motor vehicle according to claim 3, further comprising:
at least one emergency valve which, in dependence on at least one crash sensor, is opened automatically in the event of a crash so as to empty the supporting elements, whereby the table top becomes at least pliant or is moved into the not-in-use position.

5. A motor vehicle having a vehicle interior, comprising:
a dashboard arranged in front of at least one front seat;
a storage device movable in a reversible manner, by way of a movement mechanism, from a not-in-use position in the dashboard into a use position in front of the front seat, wherein
the storage device is arrested at least in the use position,
in the use position, the storage device has a carrying structure made up of two laterally arranged, inflated supporting elements,
an approximately horizontally oriented table top is arranged on the two supporting elements, and
the table top is constructed from individual lamellae.

6. The motor vehicle according to claim 5, wherein
the lamellae are rotatable about a horizontal axis of rotation, wherein the horizontal axis of rotation runs perpendicularly to the movement direction of the table top when the table top is moved from the not-in-use position into the use position and back.

7. The motor vehicle according to claim 5, wherein
a fixing plate, which extends in a vertical direction, is arranged at a rear end of the table, on a rear lamella, and
the fixing plate has at least two guide pins, which can be displaced in two guide rails, wherein the two guide rails are formed in a cavity at a placement location.

8. The motor vehicle according to claim 5, wherein
a lamella formed at a free end of the table is provided with a handle strip or a handle.

9. A motor vehicle having a vehicle interior, comprising:
a dashboard arranged in front of at least one front seat;
a storage device movable in a reversible manner, by way of a movement mechanism, from a not-in-use position in the dashboard into a use position in front of the front seat, wherein
the storage device is arrested at least in the use position,
in the use position, the storage device has a carrying structure made up of two laterally arranged, inflated supporting elements,
an approximately horizontally oriented table top is arranged on the two supporting elements,
the table top is constructed from individual lamellae,
a respective end of the respective lamella is fastened on the respective upwardly oriented outer surface of the respective supporting element.

10. The motor vehicle according to claim 9, wherein
a rolling-action spring is respectively fastened on each side of a respective upwardly directed outer surface of the respective lamella.

11. The motor vehicle according to claim 10, wherein
the rolling-action spring is subjected to maximum prestressing in the use position so that, when air is evacuated from the respective supporting element, the rolling-action spring rolls up in the direction of the not-in-use position.

12. The motor vehicle according to claim 11, wherein
the rolling-action springs have their fastened end arranged in a cavity formed in a placement location for the not-in-use position of the table.

* * * * *